United States Patent
Halliday et al.

(10) Patent No.: US 11,788,616 B2
(45) Date of Patent: Oct. 17, 2023

(54) JOURNAL BEARING

(71) Applicant: ROLLS-ROYCE plc, London (GB)

(72) Inventors: Fiona Halliday, Derby (GB); Mark Spruce, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 17/814,019

(22) Filed: Jul. 21, 2022

(65) Prior Publication Data

US 2023/0044167 A1 Feb. 9, 2023

(30) Foreign Application Priority Data

Aug. 6, 2021 (GB) ...................................... 2111348

(51) Int. Cl.
*F16H 57/08* (2006.01)
*F16C 17/02* (2006.01)

(52) U.S. Cl.
CPC ............. *F16H 57/08* (2013.01); *F16C 17/02* (2013.01); *F16C 2202/22* (2013.01); *F16C 2360/23* (2013.01); *F16C 2361/61* (2013.01); *F16H 2057/085* (2013.01)

(58) Field of Classification Search
CPC .. F16C 17/02; F16C 2360/23; F16C 2361/61; F16C 33/205; F16C 33/206; F16C 33/127; F16C 33/122; F16C 2202/22; F16C 2208/02; F16C 17/22; F16H 2057/085

See application file for complete search history.

(56) References Cited

U.S. PATENT DOCUMENTS

| 2,590,761 | A | | 3/1952 | Edgar | |
|---|---|---|---|---|---|
| 5,180,249 | A | * | 1/1993 | Hanser | F16C 17/02 403/273 |
| 8,672,801 | B2 | * | 3/2014 | McCune | F01D 25/164 475/331 |
| 9,624,645 | B2 | * | 4/2017 | Choi | F16C 33/208 |
| 10,982,563 | B1 | * | 4/2021 | Spruce | F16H 57/0479 |

(Continued)

FOREIGN PATENT DOCUMENTS

| DE | 2824805 A1 | 12/1978 | |
|---|---|---|---|
| EP | 1752670 A1 | 2/2007 | |
| EP | 2848834 A2 * | 3/2015 | ............. F16B 4/006 |

(Continued)

OTHER PUBLICATIONS

European search report dated Nov. 10, 2022, issued in EP Patent Application No. 22183216.

(Continued)

*Primary Examiner* — Sherry L Estremsky

(57) ABSTRACT

A journal bearing comprising a first component and a second component, the first and second components being arranged to rotate relative to one another in normal use. The first component comprises a first body, a first layer forming a functional surface facing the second component, and a first subsurface layer between the body and the layer. The first subsurface layer is formed of a material having a first coefficient of thermal expansion in the radial direction, and the first body is formed of a material having a second coefficient of thermal expansion in the radial direction. The first coefficient of thermal expansion is lower than the second coefficient of thermal expansion.

16 Claims, 6 Drawing Sheets

(56) References Cited

U.S. PATENT DOCUMENTS

2021/0025477 A1    1/2021  Goumas
2021/0310418 A1*   10/2021 Spruce ................... F16H 57/02

FOREIGN PATENT DOCUMENTS

| EP | 3187741   | A1 |   | 7/2017  |         |           |
|----|-----------|----|---|---------|---------|-----------|
| EP | 2848834   | B1 |   | 1/2020  |         |           |
| EP | 3739227   | A1 |   | 11/2020 |         |           |
| EP | 3892894   | A1 |   | 10/2021 |         |           |
| GB | 1550789   | A  | * | 8/1979  | ......  | F16C 17/02 |
| JP | H04119225 | A2 |   | 4/1992  |         |           |
| WO | WO-2014129718 | A1 | * | 8/2014 | ...... | E02F 9/006 |

OTHER PUBLICATIONS

Great Britain search report dated Jan. 12, 2022, issued in GB Patent Application No. 2111348.5.

* cited by examiner

JOURNAL BEARING

CROSS-REFERENCE TO RELATED APPLICATIONS

This application is based upon and claims the benefit from priority from United Kingdom patent application number GB 2111348.5 filed on Aug. 6, 2021, the entire contents of which is incorporated herein by reference.

BACKGROUND

Technical Field

The present disclosure relates to a journal bearing. The journal bearing may be implemented in the gearbox of a geared turbofan engine.

Description of the Related Art

Geared turbofan engines are known in the art. A key element of a geared turbofan engine is a planetary epicyclic gearbox positioned between a turbine and a fan. Such planetary epicyclic gearboxes typically comprise journal bearings formed between planet gears and journal bearing pins of the planetary gearbox.

The event of a journal bearing seizure in such planetary gearbox may result in a complete loss of engine power and a locked fan and is to be avoided. Seizures are typically created from oil interruption for a prolonged duration, gross overload, or excessive misalignment.

The problem underlying the present disclosure is to provide for a journal bearing which reduces the risk of a journal bearing seizure.

SUMMARY

According to a first aspect of the disclosure, a journal bearing is provided that comprises a first component and a second component, the first and second components being arranged to rotate relative to one another in normal use. The first component comprises a first body, the first body having an axis defining an axial direction and a radial direction perpendicular to the axial direction. The first component further comprises a first layer forming a functional surface facing the second component and a first subsurface layer between the body and the layer. The first subsurface layer is formed of a material having a first coefficient of thermal expansion in the radial direction, and the first body is formed of a material having a second coefficient of thermal expansion in the radial direction.

It is provided that the first coefficient of thermal expansion is lower than the second coefficient of thermal expansion.

Aspects of the disclosure are thus based on the idea to insert an additional, subsurface layer between the body of a component (such as a shaft, a bearing pin, a ring gear or a bearing bush) and the functional surface of that component, wherein the subsurface layer has a tailored coefficient of thermal expansion which is lower than the coefficient of thermal expansion of the body, this resulting in a reduced thermal expansion at high temperatures and an improved tolerance of the journal bearing against seizure under the conditions of oil interruption.

The disclosure is based on the following realizations. At the onset of a seizure event, the journal bearing functional surface ceases to be lubricated by a thin film of oil and the bearing enters a mixed friction regime. This regime involves contact between the two sides of the journal bearing leading to an increase of the effective friction coefficient by over an order of magnitude. The associated heat generation is so intense that the thermal conductivity of the journal bearing immediately supporting material is unable to transmit the heat away effectively such that high temperatures result near the journal bearing functional surface. These high temperatures cause significant thermal expansion in the regions local to the journal bearing functional surface, which reduces the clearance in the journal bearing until the functional surfaces interfere and seize together.

Accordingly, by reducing the coefficient of thermal expansion of the subsurface layer, in case of a contact between the two sides of the journal bearing the generated heat does not enter the body but the subsurface layer between the body and functional surface. However, as the subsurface layer coefficient of thermal expansion is low, heating of the subsurface layer does not lead to any substantial increase in thickness (other than when the body is heated). Rather, a local thermal expansion which would accelerate the heat generation and could result in a sudden failure of the journal bearing is avoided. The present disclosure, in other words, reduces thermal expansion at the onset of a seizure event, thereby avoiding the sequence of steps that lead to a failure of the bearing.

It is pointed out that the present disclosure considers the coefficient of thermal expansion in the radial direction of the parts involved, as a thermal expansion in the radial direction reduces the clearance in the journal bearing and is to be avoided. The coefficient of thermal expansion in the axial direction may be the same as or may be different from the coefficient of thermal expansion in the radial direction.

The first layer which forms the functional surface is formed of a material that has a third coefficient of thermal expansion in the radial direction. In some embodiments, the first coefficient of thermal expansion is also lower that the third coefficient of thermal expansion. However, as the first layer which forms the functional surface is typically of small thickness only and in any case of less thickness than the first subsurface layer, it is not substantially participating in defining the thermal radial movement of the journal bearing such that the coefficient of thermal expansion of the first layer is of limited concern.

In some embodiments, the thickness of the first layer is less than 50% or less than 20% of the thickness of the first subsurface layer.

In some embodiments, the first subsurface layer comprises a fibre-reinforced plastic, also referred to as organic composite. Accordingly, the subsurface layer comprises fibers such as carbon fibers and/or glass fibers embedded in a matrix or resin such as epoxy resin, bismaleimide (BMI) resin or cyanate ester resin. By combination of fibers and resin, the coefficient of thermal expansion in the radial direction of the subsurface layer can be tailored to be very low.

Generally, in fibre-reinforced plastic, the coefficient of thermal expansion is dominated by the fibers. The matrix/resin material typically has a coefficient of thermal expansion $\alpha$ in the range from $25*10^{-6}$ $K^{-1}$ to $50*10^{-6}$ $K^{-1}$, wherein the fibers may have a coefficient of thermal expansion $\alpha$ in the range from $-2*10^{-6}$ $K^{-1}$ to $1*10^{-6}$ $K^{-1}$. The structural properties of the composite are dominated by the fibres and hence the complete composite can typically have a coefficient of thermal expansion $\alpha$ in the range from $-1*10^{-6}$ $K^{-1}$ to $4*10^{-6}$ $K^{-1}$. However, in some embodiments, the coefficient of thermal expansion in the radial direction a is smaller than $1*10^{-6}$ $K^{-1}$ and in particular smaller than $0.1*10^{-6}$ $K^{-1}$. It may even be negative.

The main body may be high-strength steel, with a coefficient of thermal expansion from $1*10^{-6}$ $K^{-1}$ to $20*10^{-6}$ $K^{-1}$. Accordingly, in some embodiments, the ratio of the first coefficient of thermal expansion of the subsurface layer to the second coefficient of thermal expansion of the body is equal to or less than 0.01.

As the coefficient of thermal expansion of the fibre-reinforced plastic is dominated by the fibers, efficient orientation of the fibers in the composite is of importance. In some embodiments, the fibres in the fibre-reinforced plastic are predominantly oriented in the radial and circumferential directions. Such orientation leads to the fibers dominating the coefficient of thermal expansion in the radial direction. At the same time, a small proportion (such as less than 20 percent or less than 10 percent) of the fibers is preferably arranged in the direction aligned to the axis of the subsurface layer to make the subsurface layer into an engineering material and avoid the subsurface layer becoming fragile.

In order to orient or substantially orient the fibers in the radial and circumferential directions, in some embodiments, the first subsurface layer consists of a plurality of disc-like annular layers arranged successively in the axial direction, wherein each annular layer comprises a two-dimensional arrangement of fibres. Accordingly, the subsurface layer forms a ring which is composed of a plurality of layers each oriented perpendicular to the axis of the ring and arranged next to each other in the longitudinal direction. This allows to provide for a favourable orientation of the fibers.

More particularly, in some embodiments, each annular layer/slice comprises a plurality of sectors arranged in the circumferential direction, wherein each sector comprises fibres arranged in a grid with fibres oriented in a first direction and fibres oriented in a second direction perpendicular to the first direction, wherein the fibre grid is oriented such that for the fibers in the middle of a sector the first direction is the radial direction of the journal bearing. The grid of fibers may formed of a woven material comprising warp and weft threads or may be formed in any other manner that provides for a rectangular grid of fibers.

The idea of separating the annular layer in sectors is based on the realization that it is preferable that the fibers of the grid oriented in the first direction deviate from the radial direction as little as possible. The smaller the sectors, the less the deviation from the radial direction. Perfect alignment with the radial direction is only achieved for the fibers in the middle of a sector, the term "middle" referring to the circumferential distance between the sector ends.

The different sectors of the annular layers may be located directly next to each other in the circumferential direction, or there may be provided an area without any fibers between two adjacent sectors.

In some embodiments, subsequent annular layers are arranged with a rotated pattern of sectors to provide for an evenly distributed first coefficient of thermal expansion along the length of the subsurface layer.

In some embodiments, the first body is cylindrical or hollow cylindrical and the first layer and the first subsurface layer are formed as rings on or in the cylindrical or hollow cylindrical body, each ring having a thickness.

The journal bearing has a defined minimum clearance and it is provided that the first coefficient of thermal expansion and the thickness of the first subsurface layer are configured such that the combined thermal expansion of the first layer and of the first subsurface layer does not exceed the defined minimum clearance of the journal bearing (taking into account a corresponding thermal expansion of the second component). The tailoring of the coefficient of thermal expansion and of the thickness of the first subsurface layer is in further consideration of the expected temperature rise to be managed and also in consideration of the coefficient of thermal expansion and the thickness of the first layer that provides the functional surface, although the latter is of minor relevance if the first layer is very thin.

In some embodiments, the first subsurface layer has a first thermal conductivity and the first body has a second thermal conductivity, wherein the first thermal conductivity is lower that the second thermal conductivity. According to this aspect of the disclosure, the subsurface layer, in addition to having a low coefficient of thermal expansion, also has a low thermal conductivity. This is associated with the advantage that the body is insulated from the heat generated at the functional surface. The thermal insulation prevents that the body experiences a thermal expansion, thereby further reducing the risk that the clearance of the journal bearing is reduced to an extent that the functional surfaces interfere.

It is pointed out that, when the subsurface layer does not transport heat to the body, it will experience a rise in temperature. However, this is of no concern as the coefficient of thermal expansion is very low. The resin of the composite forming the subsurface layer may be chosen such that it has a higher melting temperature to avoid melting of the resin. However, even if some of the resin melts, it will be simply flushed out of the journal bearing by the oil circulation system cooling and lubricating the journal bearing.

While the coefficient of thermal expansion is dominated by fibers of the fibre-reinforced plastic, the thermal conductivity is dominated by resin of the fibre-reinforced plastic, such that the choice of the resin primarily determines the thermal conductivity. In some embodiments, the first thermal conductivity of the subsurface layer is less than 5 W/(m·K) or even less than 1 W/(m·K). Such low thermal conductivity may be provided of a fibre-reinforced plastic resin which consists of a polyimide (such as Vespel®) or other engineering plastic.

When choosing such resin, the coefficient of thermal expansion is designed to be in the low range by means of the fibers of the organic composite as discussed above.

The depth of the subsurface layer is designed such that the region of significant temperature rise is limited to the subsurface layer. A low thermal conductivity of the subsurface layer assists in protecting the original base material from the high temperatures.

The second component comprises a second body, the second body having an axis running in the axial direction, and a second layer forming a functional surface facing the first component. In some embodiments, the second component comprises a second subsurface layer between the second body and the second layer, wherein the second subsurface layer is formed of a material having a first coefficient of thermal expansion in the radial direction, and the second body is formed of a material having a second coefficient of thermal expansion in the radial direction, and wherein the first coefficient of thermal expansion is lower that the second coefficient of thermal expansion.

The embodiments discussed with respect to the first subsurface layer of the first component similarly apply to the second subsurface layer of the second component. Accordingly, in some embodiments, one of the subsurface layers or both subsurface layers are provided with a low coefficient of thermal expansion in the discussed manner.

The first body and the second body may be selected from the group comprising a journal bearing outer race and a journal bearing inner race. Accordingly, in some embodiments, the first body may be a pin forming a journal bearing inner race and the second body may be a ring gear rotating abound the pin forming a journal bearing outer race. In some embodiments, the first component may be a rotating shaft forming a journal bearing inner race and the second component may be bearing bush in which the rotating shaft rotates forming a journal bearing outer race.

In a second aspect of the disclosure, a journal bearing comprising a first component and a second component is provided, the first and second components being arranged to rotate relative to one another in normal use. The first component comprises a first body, the first body having an axis defining an axial direction and a radial direction perpendicular to the axial direction, and a first layer forming a functional surface facing the second component. The second component comprises a second body, the second body having an axis running in the axial direction, and a second layer forming a functional surface facing the first component. The journal bearing has a defined minimum clearance between the first and second components. It is provided that the first body and/or the second body are made of a fibre-reinforced plastic, the fibre-reinforced plastic having a coefficient of thermal expansion in the radial direction such low that a thermal expansion of the first and second components body does not exceed the defined minimum clearance of the journal bearing.

In this aspect of the disclosure, one or both bodies of the journal bearing are formed by a fibre-reinforced plastic having a tailored low coefficient of thermal expansion to reduce thermal expansion of the body in case of contact between the two sides of the journal bearing. Accordingly, a radial expansion of the components reducing the clearance in the journal bearing in case of heat development is avoided not by providing a subsurface layer with a low coefficient of thermal expansion as in the first aspect of the disclosure but by forming the body itself of a material with a low coefficient of thermal expansion.

The different embodiments used for the material with a low coefficient of thermal expansion discussed above similarly apply for this aspect of the disclosure. For example, the first coefficient of thermal expansion may be in the range from $-1*10^{-6}$ $K^{-1}$ to $1*10^{-6}$ $K^{-1}$ or may be less than $0.1*10^{-6}$ $K^{-1}$.

A still further aspect of the disclosure regards a planetary gearbox, the planetary gearbox comprising: a sun gear which is configured to rotate about a rotational axis of the planetary gearbox, the rotational axis defining an axial direction of the planetary gearbox; a plurality of planet gears which are driven by the sun gear; a ring gear, the planet gears meshing with the ring gear; and a plurality of journal bearing pins, each of the journal bearing pins being located in an inner bore of one of the planet gears, wherein in each case a journal bearing pin and a planet gear form a journal bearing in accordance with claim 1.

A still further aspect of the disclosure, a gas turbine engine is provided, the gas engine turbine comprising: an engine core comprising a turbine, a compressor, and a core shaft connecting the turbine to the compressor; a fan located upstream of the engine core, the fan comprising a plurality of fan blades; and a planetary gearbox in accordance with the disclosure that receives an input from the core shaft and outputs drive to the fan so as to drive the fan at a lower rotational speed than the core shaft.

In some embodiments, the turbine is a first turbine, the compressor is a first compressor, and the core shaft is a first core shaft. The engine core further comprises a second turbine, a second compressor, and a second core shaft connecting the second turbine to the second compressor, wherein the second turbine, the second compressor, and the second core shaft are arranged to rotate at a higher rotational speed than the first core shaft.

It should be noted that the present disclosure is described in terms of a cylindrical coordinate system having the coordinates x, r and φ. Here x indicates the axial direction, r the radial direction and φ the angle in the circumferential direction. The axial direction is defined by the machine axis of the gas turbine engine in which the present disclosure is implemented, with the axial direction pointing from the engine inlet to the engine outlet. The axial direction of the planetary gearbox is identical to the axial direction of the gas turbine engine. Starting from the x-axis, the radial direction points radially outwards. Terms such as "in front of" and "behind" refer to the axial direction or flow direction in the engine. Terms such as "outer" or "inner" refer to the radial direction.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The, or each, compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The, or each turbine, (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centerline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

The disclosure will be explained in more detail on the basis of exemplary embodiments with reference to the accompanying drawings in which.

DETAILED DESCRIPTION

Aspects and embodiments of the present disclosure will now be discussed with reference to the accompanying figures. Further aspects and embodiments will be apparent to those skilled in the art.

Figure 1:
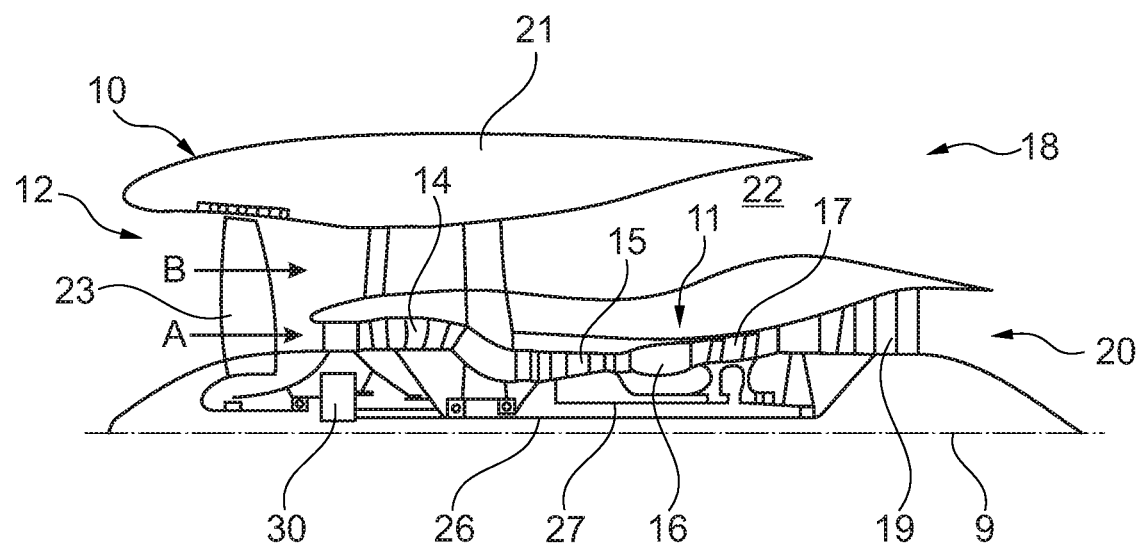
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises an engine core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high-pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust. The epicyclic gearbox 30 is a reduction gearbox.

Figure 2:
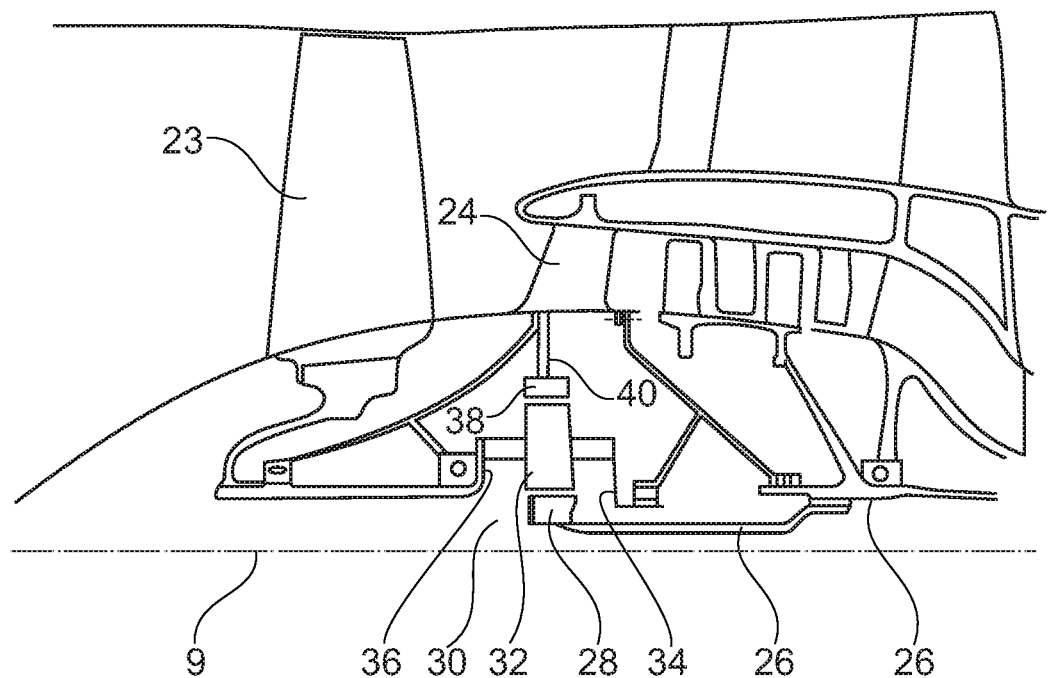
FIG. 2 is a close up sectional side view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low-pressure turbine" and "low-pressure compressor" as used herein may be taken to mean the lowest pressure turbine stages and lowest pressure compressor stages (i.e. not including the fan 23), respectively, and/or the turbine and compressor stages that are connected together by the interconnecting shaft 26 with the lowest rotational speed in the engine (i.e. not including the gearbox output shaft that drives the fan 23). In some literature, the "low-pressure turbine" and "low-pressure compressor" referred to herein may alternatively be known as the "intermediate-pressure turbine" and "intermediate-pressure compressor". Where such alternative nomenclature is used, the fan 23 may be referred to as a first, or lowest pressure, compression stage.

Figure 3:
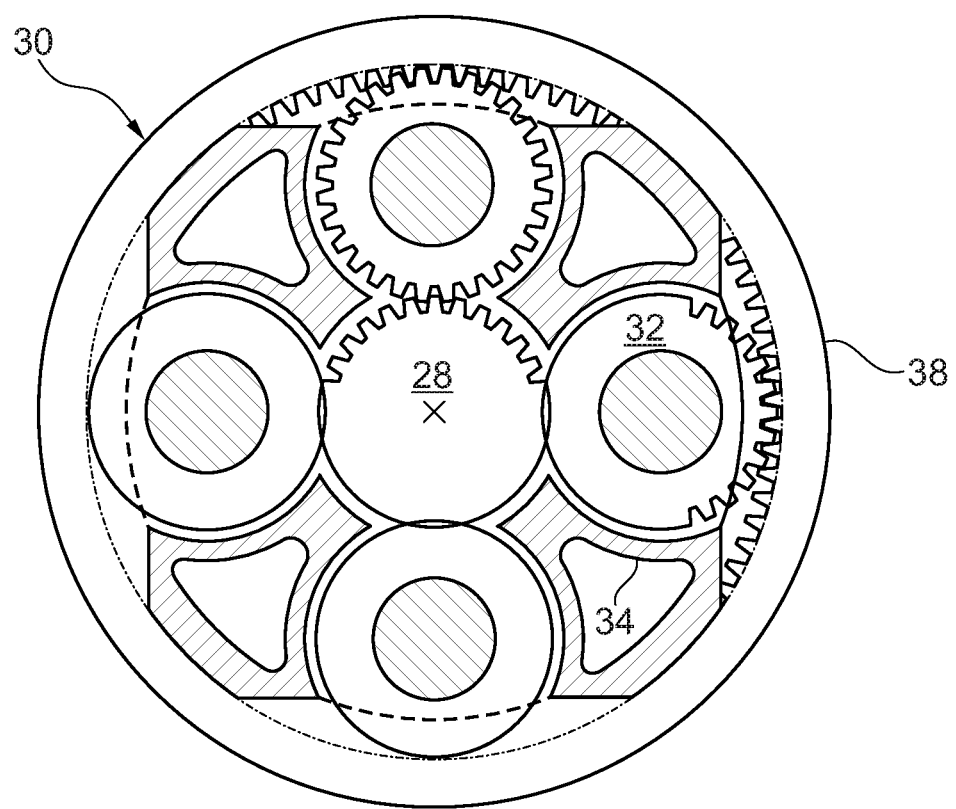
FIG. 3 is a partially cut-away view of an epicyclic gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed embodiments. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate-pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

As discussed with respect to FIGS. 1 to 3, the planetary gearbox 30 of the gas turbine engine comprises a plurality of planet gears 32. Each planet gear 32 rotates about a journal bearing pin, wherein the journal bearing pin and the planet gear form a journal bearing. This is illustrated in FIG. 4.

The planet gear 32 is hollow cylindrical and forms an outer surface and an inner surface. The planet gear 32 rotates—driven by the sun gear 28—around an axis of rotation which runs parallel to the axis of rotation of the planetary gearbox. The outer circumferential surface of the planet gear 32 forms a toothing which meshes with the toothing of a ring gear 38. The ring gear 38 is fixed, i.e., non-rotating. In other embodiments, the ring gear may be rotating, while the planet gears are fixed in their position in the gearbox. The planet gears 32 rotate due to their coupling with the sun gear 28 and travel along the circumference of the ring gear 38. The rotation of the planet gears 32 along the circumference of the ring gear 38 and around the axis of rotation 9 is slower than the rotation of the drive shaft, providing a reduction ratio.

The planet gear 32 has a central axial opening or bore 321 adjacent to its inner circumferential surface. A journal bearing pin 6 is inserted into the bore 321, which itself also has an axial bore 63, whereby the journal bearing pin 6 and the planetary gear 32 form a journal bearing 65 on their facing surfaces. The journal bearing pin 6 forms a wall 62 which has an inner surface 621 and an outer surface 622, the inner surface 621 defining the axial bore 63 and the outer surface 622 forming part of the journal bearing 65.

Figure 4:
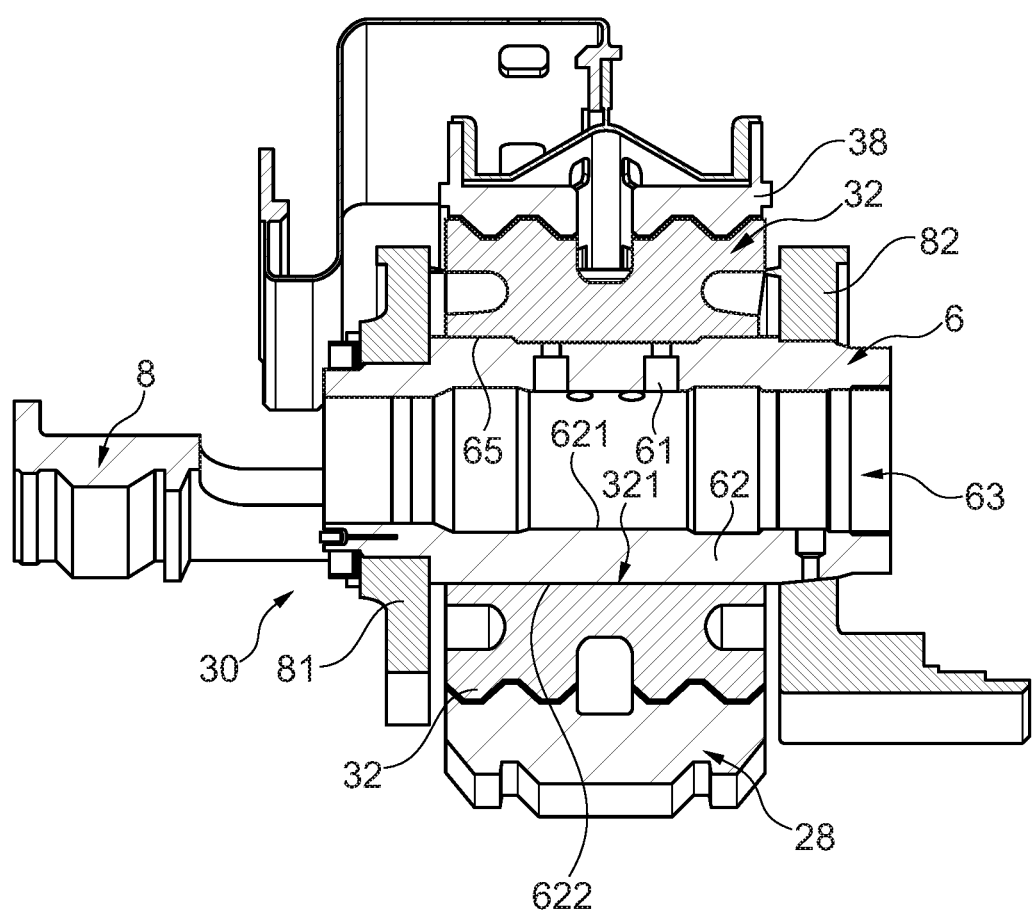
FIG. 4 is a sectional side view of an example of an epicyclic gearbox.

FIG. 4 also shows a front carrier plate 81 and a rear carrier plate 82. The journal bearing pin 6 is fixedly attached to the front carrier plate 81 and to the rear carrier plate 82, for example screwed or welded to them. The front carrier plate 81 is connected to a torque carrier 8 which may be coupled to a fan shaft.

To lubricate the bearing 65 between the journal bearing pin 6 and planet gear 32, an oil supply device is provided which comprises an oil supply channel (not shown) through which oil from a circulating oil system is fed into lubrication film openings 61 in journal bearing pin 6. A plurality of variants exist of how oil of the circulating oil system may be provided to the journal bearing 65. The oil serves to lubricate the journal bearing 65 and also serves to cool the journal bearing 65.

In the context of the present embodiment, the construction of the journal bearing 65 is of relevance. While described in the context of a planetary gearbox, the principles of the present embodiment can be applied to any journal bearing in any gearbox.

Figure 5:
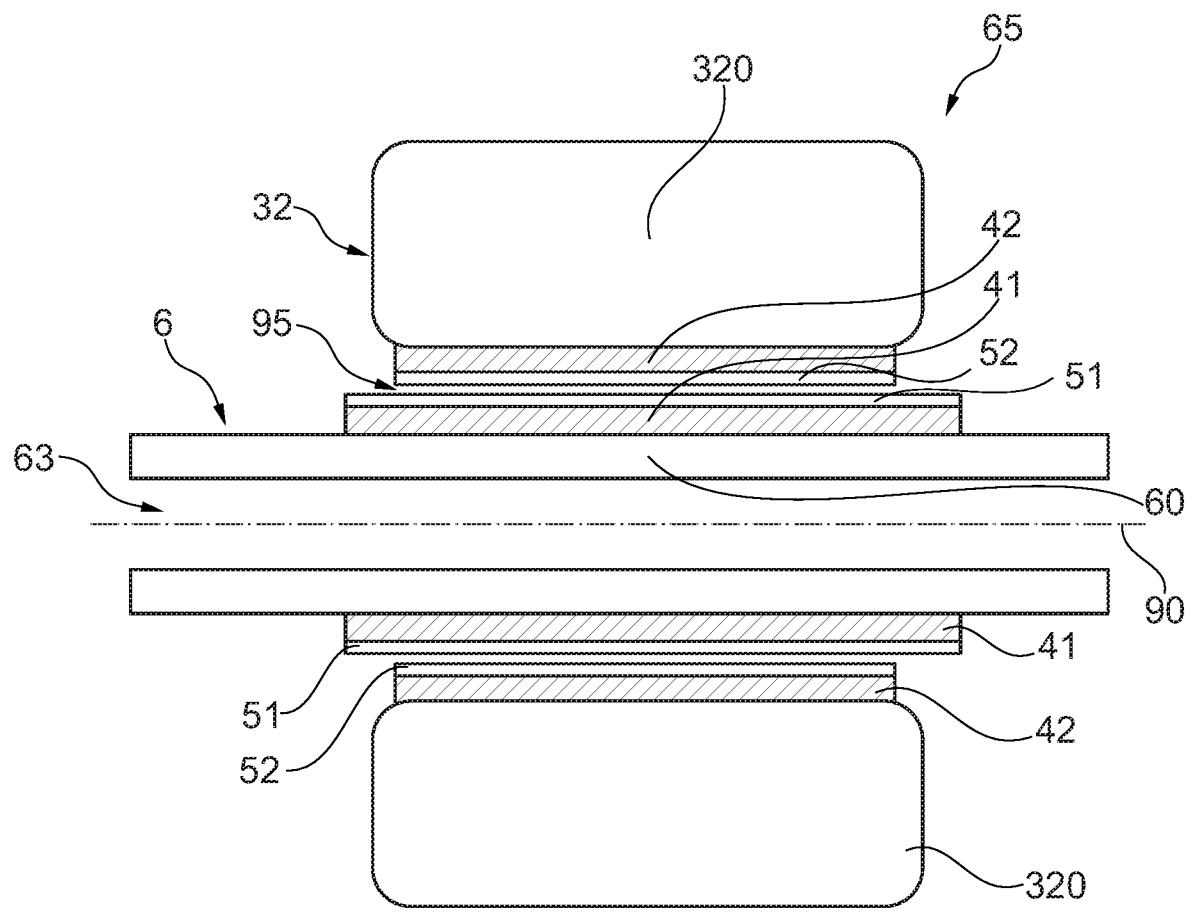
FIG. 5 is a sectional side view of an embodiment of a journal bearing, the journal bearing comprising subsurface layers formed of fibre-reinforced plastic.

FIG. 5 depicts a journal bearing 65 having a first component 6 and a second component 32. The first component 6 may be the journal bearing pin of FIG. 4 and the second component 32 may be the planet gear of FIG. 4. The first component 6 comprises a first body 60 which, in the depicted embodiment, is formed hollow-cylindrically with a central bore 63. However, alternatively, the body 60 could be a solid cylinder. The first body 60 has an axis 90 which defines an axial direction of the journal bearing 65. A radial direction runs perpendicular to the axial direction.

The first component 6 further comprises a first layer 51 which forms the functional surface of the first component and faces the other component 32. Arranged between the first body 60 and the first layer 51 is a first subsurface layer 41. The first layer 51 and the first subsurface layer 41 are both formed as outer rings, each of the rings having a defined thickness in the radial direction.

In a similar manner, the second component 32 comprises a second body 320, wherein the second body has an axis 90 which is the same axis as the axis of the first body 60. One of the first and second bodies 60, 320 is rotating in normal use. The second component 32 further comprises a second layer 52 which forms the functional surface of the second component 32 and is facing the first component 6. Arranged between the second layer 320 and the second surface 52 is a second subsurface layer 42. The second layer 52 and the second subsurface layer 42 are both formed as inner rings on an inner surface of the second body 320, each of the rings having a defined thickness in the radial direction.

The first and second layers 51, 52 and the first and second subsurface layers 41, 42 have the same central axis 90 as the first and second bodies 90, 320.

The first body 60 forms the journal bearing inner race and the second body 320 forms the journal bearing outer race, with the first and second layers 51, 52 forming the respective functional surfaces. The radial distance between the first and second layers 51, 52 defines a clearance 95 of the journal bearing 65.

In the following discussion of materials, coefficients of thermal expansion and thermal conductivities, a differentiation between the first body 60 and the second body 320, the first layer 51 and the second layer 52, and between the first subsurface layer 41 and the second subsurface layer 41 is refrained from, wherein it is referred only to the "body", "layer" and to the "subsurface layer", unless a specific difference between the respective bodies and layers is discussed. However, this does not mean that the respective first and second elements are necessarily identical. For example, as is known to the skilled person, the functional surfaces 51, 52 may be a pair of one hard surface and one soft surface, with the hard surface formed, e.g., of a steel and the soft surface formed, e.g., by a multilayer coating.

The subsurface layer 41, 42 may also be referred to as a liner.

The subsurface layer 41, 42 is formed of a material having a first coefficient of thermal expansion in the radial direction, and the body 60, 320 is formed of a material having a second coefficient of thermal expansion in the radial direction, wherein the first coefficient of thermal expansion is lower than the second coefficient of thermal expansion such that the subsurface layer 41, 42 experiences less thermal expansion in the radial direction than the body 60, 320 in case of a temperature rise.

In an example, the ratio of the first coefficient of thermal expansion to the second coefficient of thermal expansion is less than 0.01, wherein the first coefficient of thermal expansion is less than $0.1*10^{-6}$ $K^{-1}$ The low thermal conductivity of the subsurface layer 41, 42 insulates the main body 60, 320 from heat generated at the functional surfaces 51, 52. Such heat may be generated in case of a contact between the functional surfaces 51, 52. As the subsurface layer 41, 42 has a very low thermal conductivity—preferably less than $0.1*10^{-6}$ $K^{-1}$ and possibly even negative—an increase in temperature of the subsurface layer 41, 42 does not lead to a substantial radial expansion and, accordingly, does not substantially reduce the clearance 63 of the journal bearing.

In addition to having a low thermal conductivity, the subsurface layer 41, 42 may be configured to have a low thermal conductivity, the thermal conductivity being lower than the thermal conductivity of the body 60, 320. The thermal conductivity may be less than 5 W/(m·K) or even less than 1 W/(m·K). On the other hand, conventional journal bearing backing materials are steels with a thermal conductivity around 50 W/(m·K) and in any case greater than 30 W/(m·K). By having a low thermal conductivity of the subsurface layer, heat generated at the functional surfaces is hindered to be transferred in a substantial amount to the body 60, 320, thereby avoiding heating of the body which would cause an undesired thermal expansion of the body in the radial direction.

The thickness of the subsurface layer 41, 42 needs to be sufficient to create a robust part, insulate the conventional backing and be such that the low or even negative thermal expansion prevents seizure at all thermal conditions.

The subsurface layer 41, 42 is a fibre-reinforced plastic. In the fibre-reinforced plastic, the coefficient of thermal expansion in the radial direction is dominated by the fibers of the fibre-reinforced plastic, wherein the thermal conductivity is dominated by the matrix, also referred to as resin, of the fibre-reinforced plastic. This allows to tailor a fibre-reinforced plastic having both a low coefficient of thermal expansion and a low thermal conductivity.

The resin may be chosen from a broad range of resins including epoxy, bismaleimide (BMI) and cyanate esther. In embodiments with a low thermal conductivity, engineering plastics such as Vespel® may be used.

In order to provide the fibre-reinforced plastic with a low coefficient of thermal expansion in the radial direction, even when the coefficient of thermal expansion of the resin is high (it may be in the range from $25*10^{-6}$ $K^{-1}$ to $50*10^{-6}$ $K^{-1}$), an efficient orientation of fibers in the fibre-reinforced plastic is of importance.

The fibers, which may be carbon fibers or glass fibers, constrain the coefficient of thermal expansion to very low values along the length of the fibers. Hence, to achieve the required coefficient of thermal expansion, the fibers should be predominantly oriented in the radial and circumferential directions of the subsurface layer 41, 42, with only a small proportion of the fibers arranged in the direction aligned to the axis 90 of the subsurface liner 41, 42. This small proportion is required to make the subsurface layer 41, 42 into an engineering material and avoid the subsurface layer becoming fragile.

Figure 6:
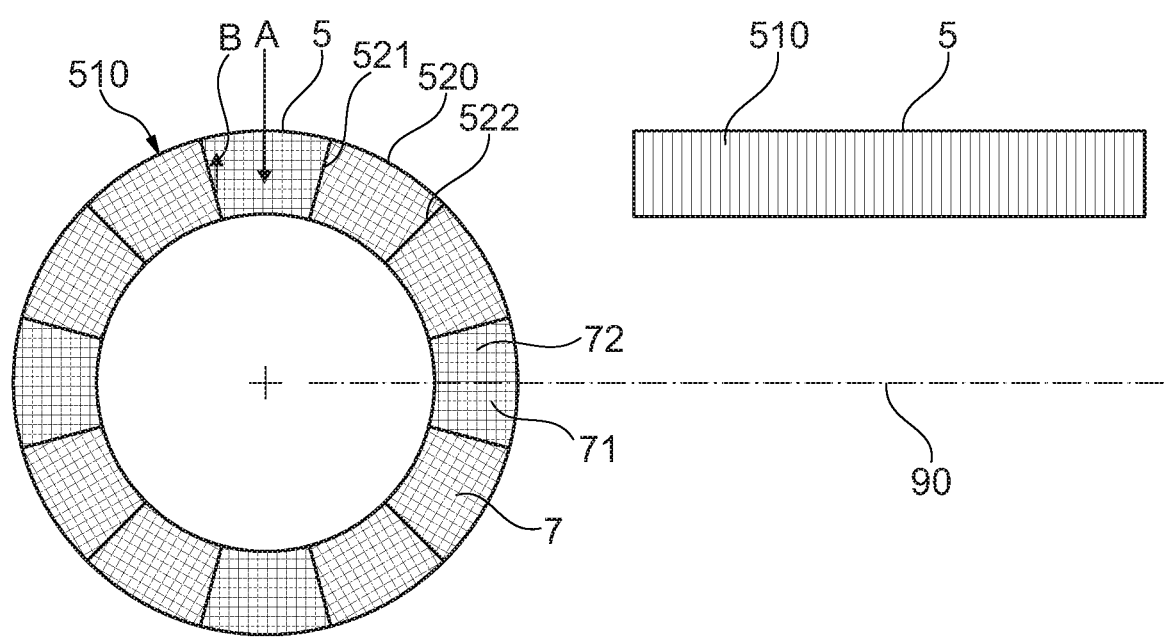
FIG. 6 is a cross sectional view and a sectional side view of a subsurface layer of the journal bearing of FIG. 5.

FIG. 6 shows an embodiment of a subsurface layer 5 with an arrangement of fibers in the radial and circumferential directions. The subsurface layer 5 may be one of the subsurface layers 51, 52 of FIG. 5. In this embodiment, the subsurface layer 5 is formed by a plurality of annular layers 510 which are arranged next to each other in the axial direction to form the subsurface layer 5. The annular layers 510 form thin slices extending in a plane perpendicular to the axis 90 of the subsurface layer 5.

Each annular layer 510 has the form of a ring which comprises a plurality of sectors 520 arranged next to each other in the circumferential direction, each sector 520 having an arrangement of fibers and sector ends 521, 522. The arrangement of fibers in each sector 520 is formed by a rectangular grid 7 of fibers, the grid 7 including fibers 71 extending in a first direction and fibers 72 extending in a second direction perpendicular to the first direction. The fibers 71, 72 may be provided by a woven two-dimensional material. However, any method to provide for a rectangular grid of fibers can be implemented.

It is provided that the fibre grid 7 is oriented such that for the fibers in the middle of a sector 520 (the middle being the middle between sector ends 521, 522) the first direction is the radial direction of the journal bearing. This is illustrated in FIG. 6 in which arrow A depicts a middle area of a sector 520 in which the fibers 71 that are oriented in the first direction run in the radial direction. The more the fibers 71 are located close to the border B to the subsequent sector 520, the more these fibers 71 deviate from the radial direction. Therefore, the more sectors 320 are provided, the better the orientation of the fibers 71 in the radial direction.

However, when orienting the carbon fibres 71, 72 in the subsurface layer 5, the actual fibre directions can deviate from the desired radial direction by a few degrees and still produce the required properties with minimal reduction. The reduction is approximated by one minus the cosine of the deviation angle, and hence sector angles of 20 degrees produce maximum deviations of 10 degrees and reductions of less than two percent.

In the embodiment of FIG. 6, the different annular layers 510 may be arranged with a rotated pattern of sectors 520 in subsequent layers 510, to avoid that the joints between the sectors 520 are all located at the same circumferential position. This ensures that the outer regions of the sectors 520 are evenly spread over the many layers of composite, and hence produce a consistent coefficient of thermal expansion at all angles around the circumference.

The manufacture of the subsurface layer of FIG. 6 may be by robot assembly, wherein a sheet of fibers is cut into sectors 520 and the sectors 520 are placed into a resin to produce one annular layer 510, and wherein the layers 520 are added sequentially.

Other possible methods of manufacture include using dry carbon reinforcement, with a secondary step of introducing the resin before the curing process in a single sided (infusion) or completely encased tool (resin transfer moulding). The subsurface layer could also be manufactured using preimpregnated fibres which have the resin already attached to the fibres before curing.

FIG. 6 describes one embodiment of the organic composite 41, 42. There are many ways to apply the fibre-reinforced plastic to the body 60, 320, i.e., the inner or outer race. In one embodiment, the inner and outer race are present when the fibre-reinforced plastic subsurface is assembled and cured or set. Such type of attachment is referred to as co-bonding. In a further embodiment, the races are push-fit, where the races are inserted into the fibre-reinforced plastic subsurface with some preload. In a still further embodiment, the races have a textured or small mechanical feature to assist attachment to the fibre-reinforced plastic subsurface.

Figure 7:
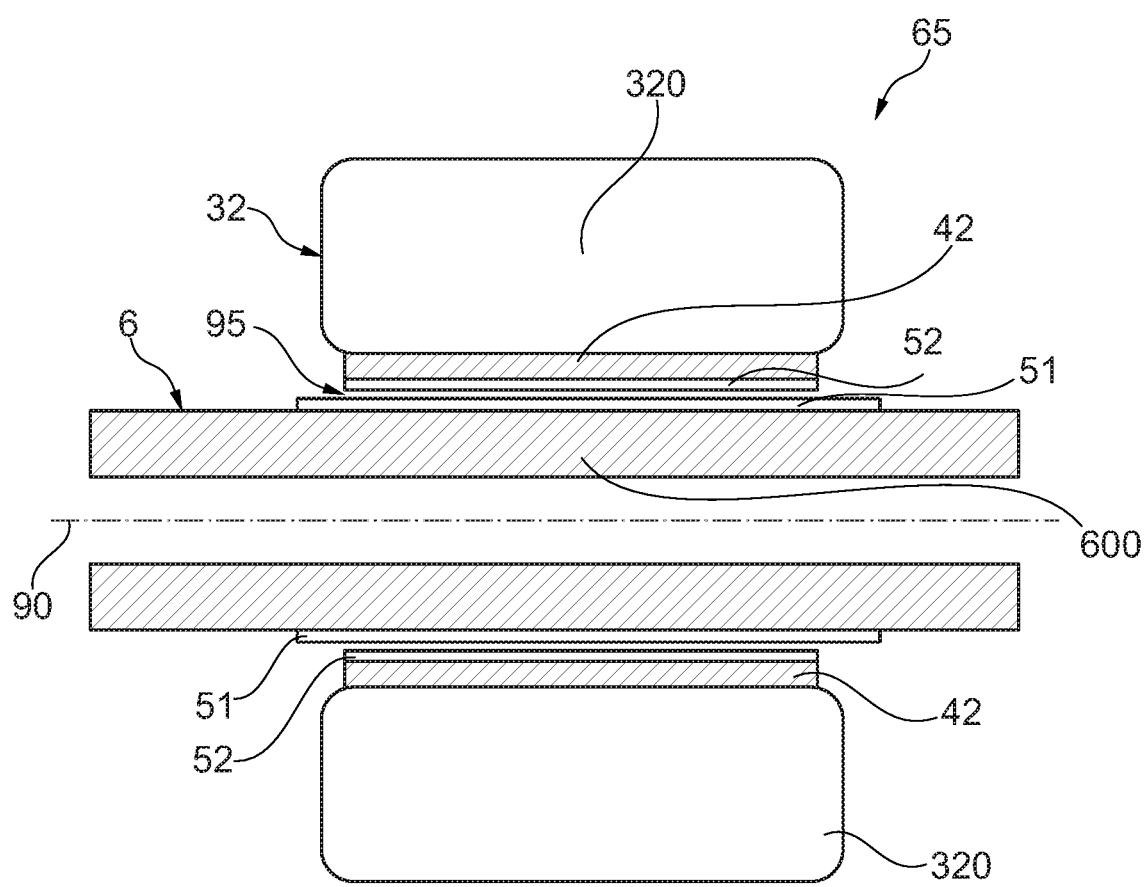
FIG. 7 is a sectional side view of a further embodiment of a journal bearing.

FIG. 7 shows an alternative embodiment of a journal bearing. The general construction of the journal bearing 65 is the same as in the embodiment of FIG. 5 and it is referred to the description of the embodiment of FIG. 5 unless differing features are discussed in the following. In particular, the second component 32 is constructed in the same manner as in FIG. 5, the second component 32 comprising a second body 320, a second layer 52 and a subsurface layer 42 of the kind discussed with respect to FIG. 5.

However, the first component 6 is constructed differently in that it comprises a first body 600 and a first layer 65 without implementing a subsurface layer. Instead, the body 600 itself is constructed of a fibre-reinforced plastic having a low coefficient of thermal expansion in the radial direction in the manner discussed. Accordingly, in this embodiment, the construction of the body 600 with a fibre-reinforced plastic with a low coefficient of thermal expansion replaces the first subsurface layer 41 of the embodiment of FIG. 5.

Similarly, in an alteration of the embodiment of FIG. 7, the subsurface layer 42 of the second component 32 may be avoided by forming the second body 320 out of a fibre-reinforced plastic with a low coefficient of thermal expansion. In a still further embodiment, the first component 6 is constructed as in the embodiment of FIG. 7 and the second component 32 only comprises a body 320 out of fibre-reinforced plastic with a low coefficient of thermal expansion.

In all embodiments, the coefficient of thermal expansion in the radial direction of the first and second body 600, 325 and of the subsurface layer, if present, are tailored such that a thermal expansion of the first and second components 6, 32 does not exceed a predefined minimum clearance 95 of the journal bearing 65 under conditions in which the components 6, 32 enter a mixed friction regime at the onset of a seizure event, wherein the present choice of materials and coefficients of thermal expansion avoids that such onsets develop into a full seizure.

It should be understood that the above description is intended for illustrative purposes only, and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

We claim:

1. A journal bearing comprising a first component and a second component, the first component and the second component being arranged to rotate relative to one another in normal use, wherein the first component comprises:
   a first body that has an axis defining an axial direction and a radial direction perpendicular to the axial direction;
   a first layer forming a functional surface facing the second component; and
   a first subsurface layer between the first body and the first layer;
   wherein the first subsurface layer is formed of a material having a first coefficient of thermal expansion in the radial direction, and the first body is formed of a material having a second coefficient of thermal expansion in the radial direction;
   wherein the first coefficient of thermal expansion is lower than the second coefficient of thermal expansion;
   wherein the first subsurface layer comprises a fibre-reinforced plastic; and
   wherein the fibres in the fibre-reinforced plastic are predominantly oriented in the radial and circumferential directions.

2. The journal bearing of claim 1, wherein the first layer is formed of a material having a third coefficient of thermal expansion in the radial direction and the first coefficient of thermal expansion is also lower than the third coefficient of thermal expansion.

3. The journal bearing of claim 1, wherein the first subsurface layer consists of a plurality of annular layers arranged successively in the axial direction, wherein each annular layer comprises an arrangement of fibres.

4. The journal bearing of claim 3, wherein each annular layer comprises a plurality of sectors arranged in the circumferential direction, wherein each sector comprises fibres arranged in a grid with fibres oriented in a first direction and fibres oriented in a second direction perpendicular to the first direction, wherein the fibre grid is oriented such that for the fibers in the middle of a sector the first direction is the radial direction of the journal bearing.

5. The journal bearing of claim 4, wherein subsequent annular layers are arranged with a rotated pattern of sectors to provide for an evenly distributed first coefficient of thermal expansion.

6. The journal bearing of claim 1, wherein the first coefficient of thermal expansion is in the range from $-1*10^{-6}$ K$^{-1}$ to $1*10^{-6}$ K$^{-1}$.

7. The journal bearing of claim 1, wherein first coefficient of thermal expansion is less than $0.1*10^{-6}$ K$^{-1}$.

8. The journal bearing of claim 1, wherein the ratio of the first coefficient of thermal expansion to the second coefficient of thermal expansion is equal or less than 0.01.

9. The journal bearing of claim 1, wherein the first body is cylindrical or hollow cylindrical and the first layer and the first subsurface layer are formed as rings on or in the first body, each ring having a thickness.

10. The journal bearing of claim 9, wherein the journal bearing has a defined minimum clearance, and wherein the first coefficient of thermal expansion and the thickness of the first subsurface layer are configured such that the combined thermal expansion of the first layer and of the first subsurface layer does not exceed the defined minimum clearance of the journal bearing.

11. The journal bearing of claim 1, wherein the first subsurface layer has a first thermal conductivity and the first body has a second thermal conductivity, wherein the first thermal conductivity is lower than the second thermal conductivity.

12. The journal bearing of claim 11, wherein the first thermal conductivity is less than 5 W/(m·K).

13. The journal bearing of claim 1, wherein the second component comprises:
   a second body that has an axis running in the axial direction;
   a second layer forming a functional surface facing the first component; and
   a second subsurface layer between the second body and the second layer;
   wherein the second subsurface layer is formed of a material having a first coefficient of thermal expansion in the radial direction, and the second body is formed of a material having a second coefficient of thermal expansion in the radial direction; and the first coefficient of thermal expansion is lower than the second coefficient of thermal expansion.

14. The journal bearing of claim 1, wherein the first body and the second body are selected from the group comprising a journal bearing outer race and a journal bearing inner race.

15. A planetary gearbox comprising:

a sun gear that is configured to rotate about a rotational axis of the planetary gearbox, the rotational axis defining an axial direction of the planetary gearbox;

a plurality of planet gears which are driven by the sun gear;

a ring gear, the planet gears meshing with the ring gear; and a plurality of journal bearing pins, each of the journal bearing pins being located in an inner bore of one of the planet gears, wherein in each case a journal bearing pin and a planet gear form a journal bearing of claim 1.

16. A gas turbine engine comprising:

an engine core comprising a turbine, a compressor, and a core shaft connecting the turbine to the compressor;

a fan located upstream of the engine core, the fan comprising a plurality of fan blades;

and a planetary gearbox of claim 15 that receives an input from the core shaft and outputs drive to the fan so as to drive the fan at a lower rotational speed than the core shaft.

\* \* \* \* \*